United States Patent
Nishi et al.

(10) Patent No.: US 8,640,447 B2
(45) Date of Patent: Feb. 4, 2014

(54) EXHAUST EMISSION CONTROL DEVICE FOR INTERNAL COMBUSTION ENGINE

(75) Inventors: Tomohiro Nishi, Wako (JP); Kei Kuroki, Wako (JP); Norihiko Suzuki, Wako (JP); Kenji Katayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 13/397,678

(22) Filed: Feb. 16, 2012

(65) Prior Publication Data

US 2012/0216512 A1    Aug. 30, 2012

(30) Foreign Application Priority Data

Feb. 25, 2011  (JP) ................. 2011-040266

(51) Int. Cl.
*F01N 3/00* (2006.01)
*F01N 3/02* (2006.01)
*F01N 3/20* (2006.01)

(52) U.S. Cl.
USPC ............... 60/299; 60/286; 60/300; 60/301

(58) Field of Classification Search
USPC ................... 60/286, 299, 300, 301
See application file for complete search history.

(56) References Cited

U.S. PATENT DOCUMENTS

| | | | |
|---|---|---|---|
| 2006/0217263 A1* | 9/2006 | Kawamoto et al. | 502/304 |
| 2008/0044330 A1* | 2/2008 | Chen et al. | 423/213.5 |
| 2008/0219906 A1* | 9/2008 | Chen et al. | 423/213.5 |
| 2009/0022641 A1* | 1/2009 | Chen et al. | 423/239.1 |
| 2010/0087314 A1* | 4/2010 | Kitamura et al. | 502/304 |

FOREIGN PATENT DOCUMENTS

| | | |
|---|---|---|
| JP | 2007-278100 | 10/2007 |
| WO | WO 2010/061804 A1 | 6/2010 |

* cited by examiner

*Primary Examiner* — Thomas Denion
*Assistant Examiner* — Dapinder Singh
(74) *Attorney, Agent, or Firm* — Ditthavong Mori & Steiner, P.C.

(57) ABSTRACT

An exhaust emission control device includes a catalytic converter arranged in an exhaust passage of the internal combustion engine. The catalytic converter includes an upstream catalytic converter and a downstream catalytic converter arranged on a downstream side of the upstream catalytic converter. The upstream catalytic converter includes a first support and a first catalyst supported on the first support. The first catalyst includes a first lower layer catalyst and a first upper layer catalyst. Pd in the first lower layer catalyst is supported only on the oxygen storage component contained in the first catalyst. The first upper layer catalyst is provided on the first lower layer catalyst, Pd in the first upper layer catalyst being supported on each of the oxygen storage component and $Al_2O_3$ contained in the first catalyst.

9 Claims, 10 Drawing Sheets

BACKGROUND ART

UPSTREAM SIDE OF
UPSTREAM CATALYTIC
CONVERTER
(BACKGROUND
ART)

DOWNSTREAM SIDE OF
UPSTREAM CATALYTIC
CONVERTER
(BACKGROUND
ART)

DOWNSTREAM SIDE OF
DOWNSTREAM CATALYTIC
CONVERTER
(BACKGROUND
ART)

EXHAUST EMISSION CONTROL DEVICE FOR INTERNAL COMBUSTION ENGINE

CROSS-REFERENCE TO RELATED APPLICATIONS

The present application claims priority under 35 U.S.C. §119 to Japanese Patent Application No. 2011-040266, filed Feb. 25, 2011, entitled "Exhaust emission control device for internal combustion engine". The contents of this application are incorporated herein by reference in their entirety.

BACKGROUND OF THE INVENTION

1. Field of the Invention

The present invention relates to an exhaust emission control device for an internal combustion engine.

2. Discussion of the Background

An exhaust emission control device including a catalytic converter configured to purify exhaust has been traditionally arranged in the exhaust system of an internal combustion engine. The catalytic converter includes an exhaust purification catalyst configured to reduce carbon monoxide (hereinafter, referred to as "CO"), non-methane organic gases (hereinafter, referred to as "NMOG"), and nitrogen oxides (hereinafter, referred to as "NOx") in the exhaust.

A common catalytic converter includes a support and an exhaust purification catalyst supported on the support. More specifically, a common catalytic converter includes a support composed of a ceramic material or a metal, the support having a honeycomb structure that includes a plurality of cells therein; and an exhaust purification catalyst containing noble metals, such as platinum (hereinafter, referred to as "Pt"), palladium (hereinafter, referred to as "Pd"), and rhodium (hereinafter, referred to as "Rh"), the exhaust purification catalyst being supported on the support (see, for example, Japanese Unexamined Patent Application Publication No. 2007-278100).

The noble metals, such as Pt, Pd, and Rh, are known to be very expensive. So, the amount thereof used is required to be minimized from the viewpoint of reducing the cost of the exhaust purification catalyst. FIG. 12 is a graph illustrating annual changes in the prices of Pt, Pd, and Rh. As illustrated in FIG. 12, among these noble metals, Rh is the highest average price, and the price fluctuation range of Rh is large. So, a reduction in the amount of Rh used is strongly required.

The inventors have reported a technique in which the amount of Rh used is reduced without reducing exhaust purification efficiency (see, for example, WO2010/61804). In the technique described in WO2010/61804, a catalytic converter unit configured to purify exhaust includes two converters: an upstream catalytic converter and a downstream catalytic converter. The amount of Rh in the downstream catalytic converter is larger than that in the upstream catalytic converter. The degree of poisoning of Rh by phosphorus and sulfur in exhaust is increased when Rh is arranged at a more upstream portion, thus causing a reduction in the purification performance of Rh. In this technique, the small amount of Rh used in the upstream catalytic converter suppresses the poisoning of Rh, thereby reducing the amount of Rh used.

Furthermore, in the technique described in WO2010/61804, the exhaust purification catalyst in the upstream catalytic converter has a three-layer structure. Rh is arranged in layers other than the outermost layer. The degree of poisoning of Rh is increased with decreasing distance from the surface. In this technique, Rh is arranged in the layers other than the outermost layer, thereby suppressing the poisoning of Rh and reducing the amount of Rh used.

Moreover, in the technique described in WO2010/61804, the amount of an oxygen storage component (hereinafter, referred to as an "OSC") in the upstream catalytic converter is larger than that in the downstream catalytic converter. The OSC has the capability of occluding oxygen in an oxidizing atmosphere and releasing oxygen in a reducing atmosphere. In this technique, a larger amount of the OSC is arranged in the upstream catalytic converter. So, the air-fuel ratio of exhaust passing through the downstream catalytic converter is stably controlled in the vicinity of the stoichiometric ratio, thereby improving the exhaust purification efficiency of the downstream catalytic converter.

SUMMARY OF THE INVENTION

According to one aspect of the present invention, an exhaust emission control device for an internal combustion engine includes a catalytic converter arranged in an exhaust passage of the internal combustion engine. The catalytic converter is configured to purify exhaust from the internal combustion engine. The catalytic converter includes an upstream catalytic converter and a downstream catalytic converter arranged on a downstream side of the upstream catalytic converter. The upstream catalytic converter includes a first support and a first catalyst supported on the first support. The first catalyst contains $Al_2O_3$, Pd, and an oxygen storage component that has a function of storing and releasing oxygen. The first catalyst includes a first lower layer catalyst and a first upper layer catalyst. The first lower layer catalyst is provided on the first support. Pd in the first lower layer catalyst is supported only on the oxygen storage component contained in the first catalyst. The first upper layer catalyst is provided on the first lower layer catalyst, Pd in the first upper layer catalyst being supported on each of the oxygen storage component and $Al_2O_3$ contained in the first catalyst.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a perspective view of the upstream catalytic converter, and FIG. 2B is an enlarged fragmentary end view of the upstream catalytic converter taken in a radial direction;

DESCRIPTION OF THE EMBODIMENTS

Figure 1:
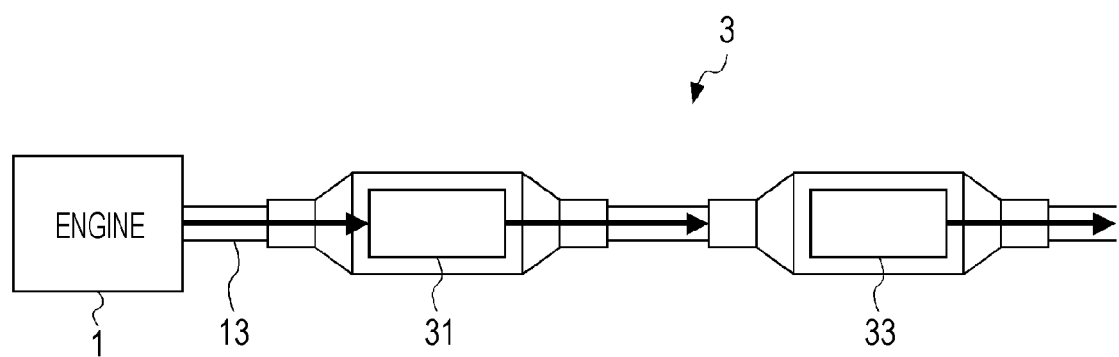
FIG. 1 illustrates the structure of an exhaust emission control device for an internal combustion engine according to an embodiment of the present invention.

The embodiments will now be described with reference to the accompanying drawings, wherein like reference numerals designate corresponding or identical elements throughout the various drawings.

FIG. 1 illustrates an internal combustion engine 1 (hereinafter, referred to as an "engine") and an exhaust emission control device 3 therefor according to this embodiment.

The exhaust emission control device 3 includes an upstream catalytic converter 31 connected to an exhaust pipe 13 of the engine 1; and a downstream catalytic converter 33 connected to a portion of the exhaust pipe 13 located on the downstream side of the upstream catalytic converter 31.

Each of the upstream catalytic converter 31 and the downstream catalytic converter 33 includes a three-way catalyst serving as exhaust purifying catalyst on a support having a honeycomb structure.

Figure 2A:
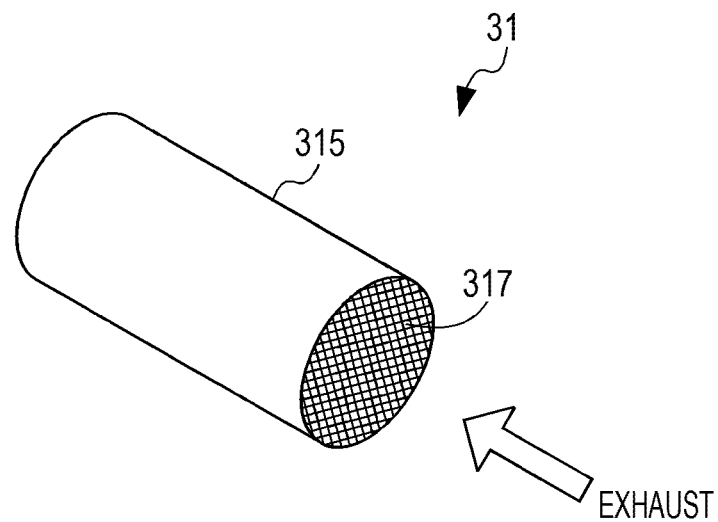
FIGS. 2A and 2B illustrate the structure of an upstream catalytic converter according to the embodiment.
Figure 2B:
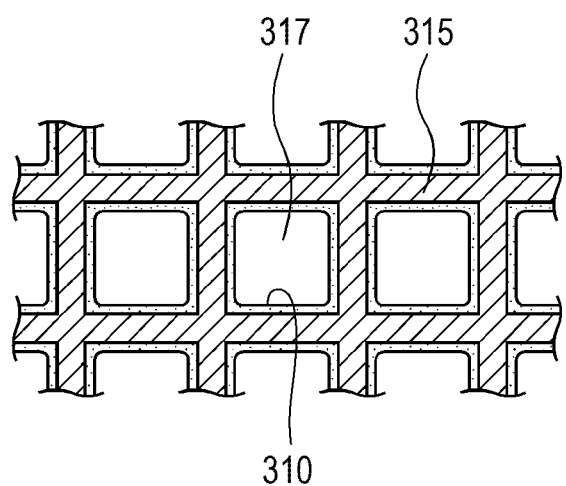

FIGS. 2A and 2B illustrate the structure of the upstream catalytic converter 31. FIG. 2A is a perspective view of the upstream catalytic converter 31. FIG. 2B is an enlarged fragmentary end view of the upstream catalytic converter 31 taken in a radial direction.

As illustrated in FIG. 2A, the upstream catalytic converter 31 includes a support 315 having a cylindrical honeycomb structure. The support 315 is composed of a ceramic material or a metal and includes a plurality of cells 317. As illustrated in FIG. 2B, a first catalyst 310 serving as an exhaust purifying catalyst is supported on inner walls of the cells 317 in the support 315.

Exhaust from the engine 1 passes through the exhaust pipe 13 and enters the cells 317 from the upstream end face of the upstream catalytic converter 31. The exhaust is purified by the first catalyst 310 during passage through the cells 317. The purified exhaust is guided to the downstream catalytic converter 33 through the exhaust pipe 13.

Figure 3:
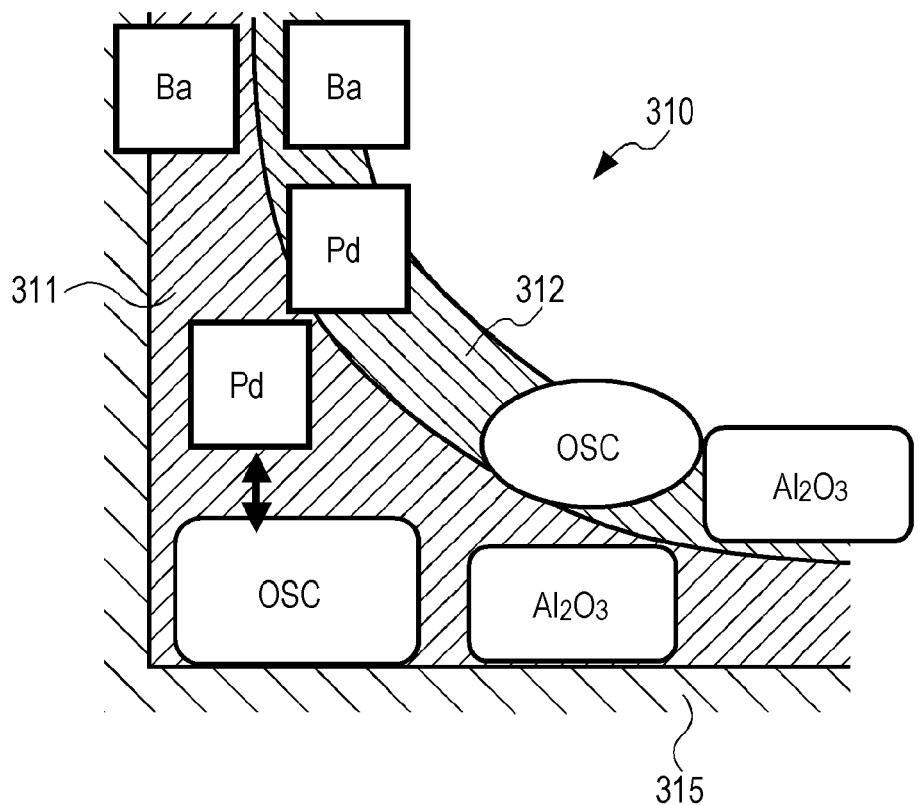
FIG. 3 is a schematic view of the structure of a first catalyst according to the embodiment.

FIG. 3 is a schematic view illustrating the structure of the first catalyst 310.

As illustrated in FIG. 3, the first catalyst 310 is supported on the support 315. The first catalyst 310 is a three-way catalyst and contains only Pd as a noble metal. In addition, the first catalyst 310 contains $Al_2O_3$, Ba, and an OSC that has functions of storing and releasing oxygen.

The first catalyst 310 has a two-layer structure and includes a first lower layer catalyst 311 arranged on the support 315 and a first upper layer catalyst 312 arranged on the first lower layer catalyst 311.

The first lower layer catalyst 311 contains Pd, the OSC, $Al_2O_3$, and Ba. As the OSC, at least one compound selected from $CeO_2$, $ZrO_2$, and complex oxides of Ce and Zr is used.

Figure 4:
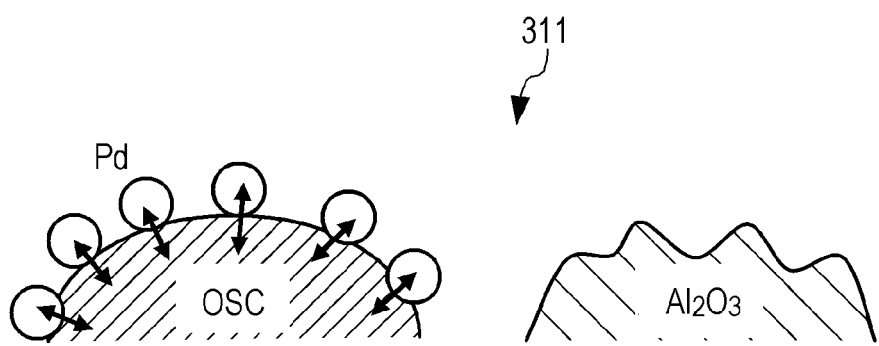
FIG. 4 is a schematic view of the structure of a first lower layer catalyst according to the embodiment.

FIG. 4 is a schematic view illustrating the structure of the first lower layer catalyst 311. As illustrated in FIG. 4, in the first lower layer catalyst 311, Pd, which is a noble metal, is supported only on the OSC. As a method for supporting the catalyst, a known method, such as impregnation, may be used. The same is true of the following description.

As with the first lower layer catalyst 311, the first upper layer catalyst 312 contains Pd, an OSC, $Al_2O_3$, and Ba. As the OSC, at least one compound selected from $CeO_2$, $ZrO_2$, and complex oxides of Ce and Zr may be used.

Figure 5:
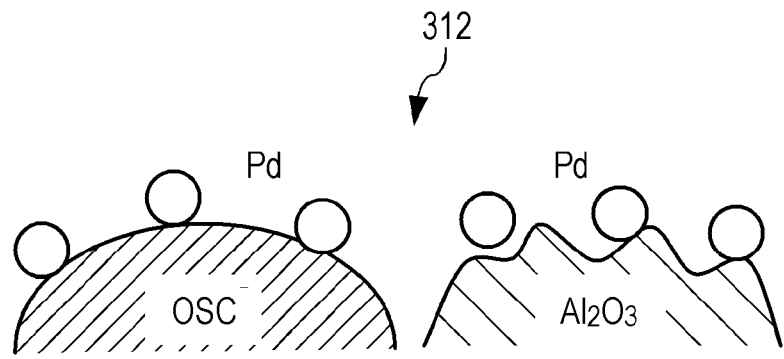
FIG. 5 is a schematic view of the structure of a first upper layer catalyst according to the embodiment.

FIG. 5 is a schematic view illustrating the structure of the first upper layer catalyst 312. As illustrated in FIG. 5, in the first upper layer catalyst 312, Pd, which is a noble metal, is supported on each of the OSC and $Al_2O_3$.

Here, the Pd content of the first upper layer catalyst 312 is set so as to be lower than the Pd content of the first lower layer catalyst 311.

The total amount of the OSC content and the $Al_2O_3$ content of the first upper layer catalyst 312 is set so as to be lower than the total amount of the OSC content and the $Al_2O_3$ content of the first lower layer catalyst 311.

The ratio of the OSC content to the $Al_2O_3$ content of the first lower layer catalyst 311 is set so as to be higher than the ratio of the OSC content to the $Al_2O_3$ content of the first upper layer catalyst 312.

The downstream catalytic converter 33 includes a support similar to that of the upstream catalytic converter 31. A second catalyst 330 serving as an exhaust purifying catalyst is supported on inner walls of cells in the support.

The exhaust purified by the upstream catalytic converter 31 passes through the exhaust pipe 13 and enters the cells from the upstream end face of the downstream catalytic converter 33. The exhaust is purified by the second catalyst 330 during passage through the cells. The exhaust purified by the downstream catalytic converter 33 is emitted into the atmosphere through the exhaust pipe 13.

Figure 6:
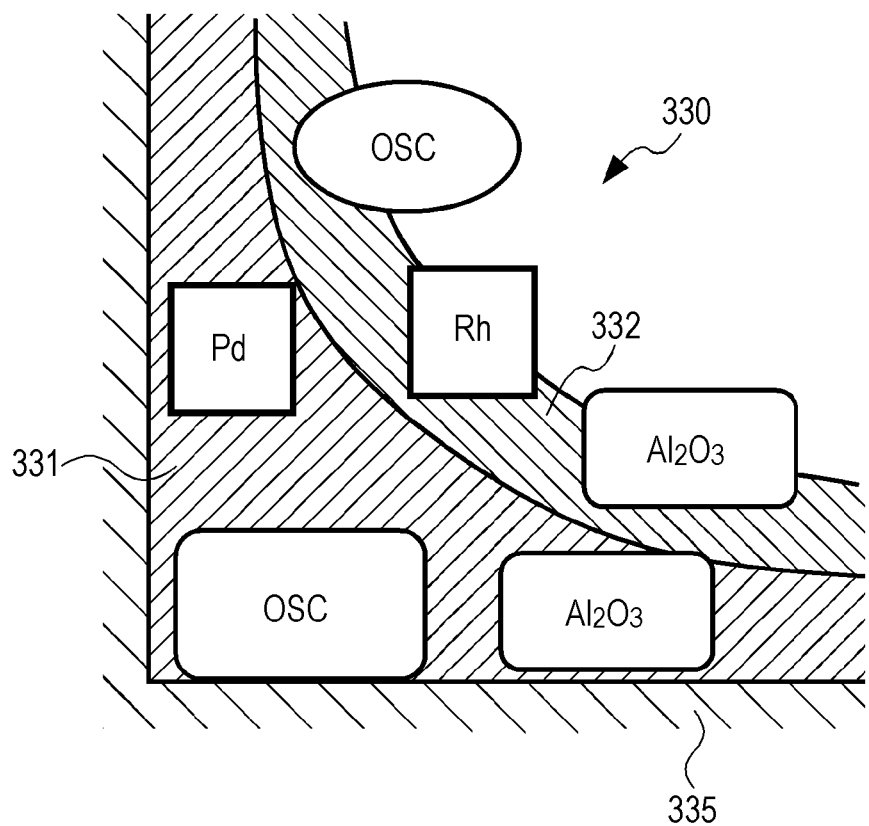
FIG. 6 is a schematic view of the structure of a second catalyst according to the embodiment.

FIG. 6 is a schematic view illustrating the structure of the second catalyst 330.

As illustrated in FIG. 6, the second catalyst 330 is supported on a support 335. The second catalyst 330 is a three-way catalyst and contains Pd and Rh as noble metals. In addition, the second catalyst 330 contains $Al_2O_3$ and an OSC that has functions of storing and releasing oxygen.

The second catalyst 330 has a two-layer structure and includes a second lower layer catalyst 331 arranged on the support 335 and a second upper layer catalyst 332 arranged on the second lower layer catalyst 331.

The second lower layer catalyst 331 contains Pd, the OSC, and $Al_2O_3$. As the OSC, at least one compound selected from $CeO_2$, $ZrO_2$, and complex oxides of Ce and Zr is used.

In the second lower layer catalyst 331, Pd, which is a noble metal, is supported on each of the OSC and $Al_2O_3$.

The second upper layer catalyst 332 contains Rh, an OSC, and $Al_2O_3$. As the OSC, at least one compound selected from $CeO_2$, $ZrO_2$, and complex oxides of Ce and Zr may be used.

In the second upper layer catalyst 332, Rh, which is a noble metal, is supported on each of the OSC and $Al_2O_3$.

Here, the total amount of the Pd content and the Rh content of the second catalyst 330 is set so as to be lower than the total amount of the Pd content of the first catalyst 310.

The total amount of the OSC content and the $Al_2O_3$ content of the second lower layer catalyst 331 is set so as to be higher than the total amount of the OSC content and the $Al_2O_3$ content of the second upper layer catalyst 332.

The upstream catalytic converter 31 and the downstream catalytic converter 33 having the foregoing structures are formed by the following procedure.

Components constituting the first lower layer catalyst or the second lower layer catalyst are dispersed in a solvent, such as water, to prepare a slurry. A support is immersed in the slurry, withdrawn therefrom, dried, and fired to form a washcoat layer (first lower layer catalyst or second lower layer catalyst) on the support. The slurry concentration is appropriately adjusted in such a manner that a predetermined thickness of the washcoat layer is achieved. The first upper layer catalyst or the second upper layer catalyst are formed on the foregoing washcoat layer by the repetition of the same process as above.

Thereby, the upstream catalytic converter 31 and the downstream catalytic converter 33 are formed.

In the exhaust emission control device 3 having the foregoing structure according to this embodiment, the upstream catalytic converter 31 is free from Rh and contains only Pd as a noble metal. In the case where the amount of Rh is zero and Pd is contained as an alternative to Rh, the effects on the exhaust purification performance will be described below.

Conventional Example 1 in Table 1 indicates the catalytic converter unit included in the exhaust emission control device described in WO2010/61804. Conventional Example 2 indicates a catalytic converter unit the same as the catalytic converter unit described in Conventional Example 1, except that Rh in the upstream catalytic converter is replaced with Pd and the Rh content of the upstream catalytic converter is zero. The catalytic converter units of Conventional Examples 1 and 2 are attached to respective test cars. The test cars are driven under the same conditions in the U.S. LA-4 mode (combination of urban driving and highway driving). The measurement results of the tailpipe emissions are illustrated in FIG. 7.

TABLE 1

| | Upstream catalytic converter | | Downstream catalytic converter | | Total amount | |
|---|---|---|---|---|---|---|
| | Pd (g/L) | Rh (g/L) | Pd (g/L) | Rh (g/L) | Pd (g/L) | Rh (g/L) |
| Conventional Example 1 | 4.00 | 0.55 | 0.75 | 0.45 | 4.75 | 1.00 |
| Conventional Example 2 | 4.55 | 0 | 0.75 | 0.45 | 5.30 | 0.45 |

Figure 7:
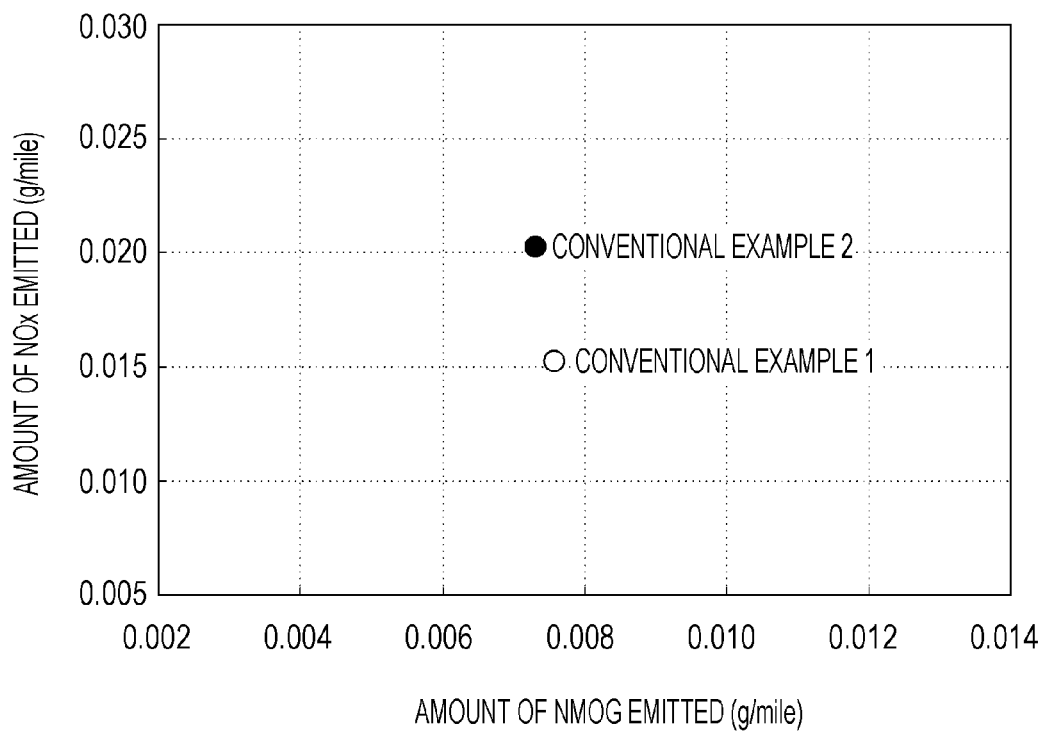
FIG. 7 illustrates the amount of NMOG emitted and the amount of NOx emitted in the Conventional Examples 1 and 2.

FIG. 7 illustrates the amount of NMOG emitted and the amount of NOx emitted in the Conventional Examples 1 and 2. As is clear from FIG. 7, in Conventional Example 2 in which the Rh content of the upstream catalytic converter is zero, the amount of NOx emitted is increased compared with Conventional Example 1. The results demonstrate that the removal of NOx is greatly affected by the absence of Rh.

As described above, in the case where the amount of Rh is zero and Pd is contained as an alternative to Rh, the exhaust purification performance is degraded. The reason for this is that first, Pd has a low capability of occluding and releasing oxygen, compared with Rh.

Figure 8:
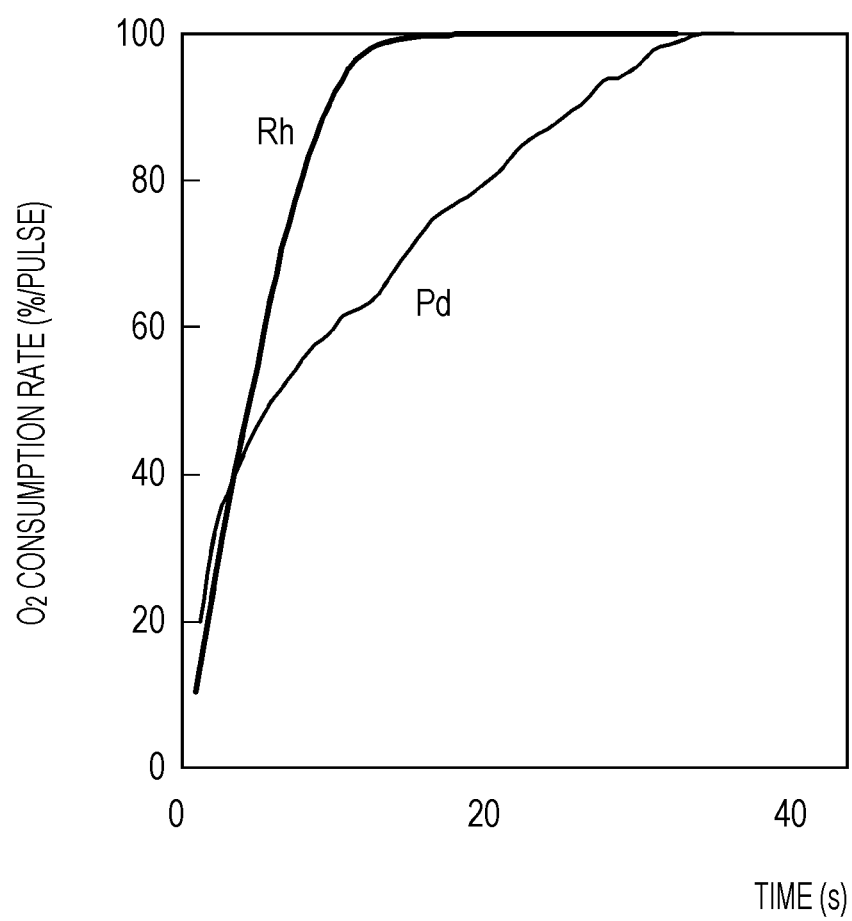
FIG. 8 is a graph illustrating the rates of oxidation of Rh and Pd.

FIG. 8 is a graph illustrating the rates of oxidation of Rh and Pd. Specifically, the graph illustrates $O_2$ consumption rates with time when an $O_2$ pulse test is performed on Rh and Pd. As is clear from FIG. 8, the $O_2$ consumption rate of Pd is lower than that of Rh. This indicates that the rate of oxidation of Pd is lower than that of Rh and that Pd has a low capability of allowing the OSC to occlude and release oxygen, compared with Rh.

Figure 9A:
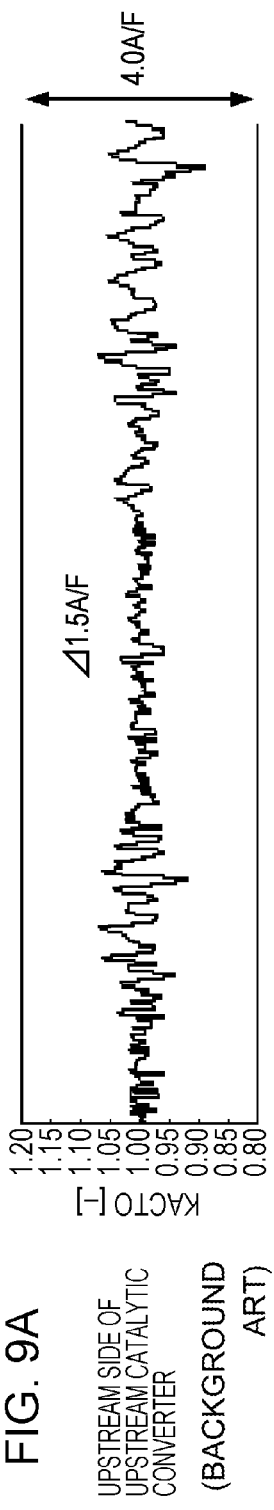
FIGS. 9A, 9B, and 9C illustrate air-fuel ratios (A/F) in exhaust on the upstream side of an upstream catalytic converter, the downstream side of the upstream catalytic converter, and the downstream side of an downstream catalytic converter in Conventional Example 1.
Figure 9B:
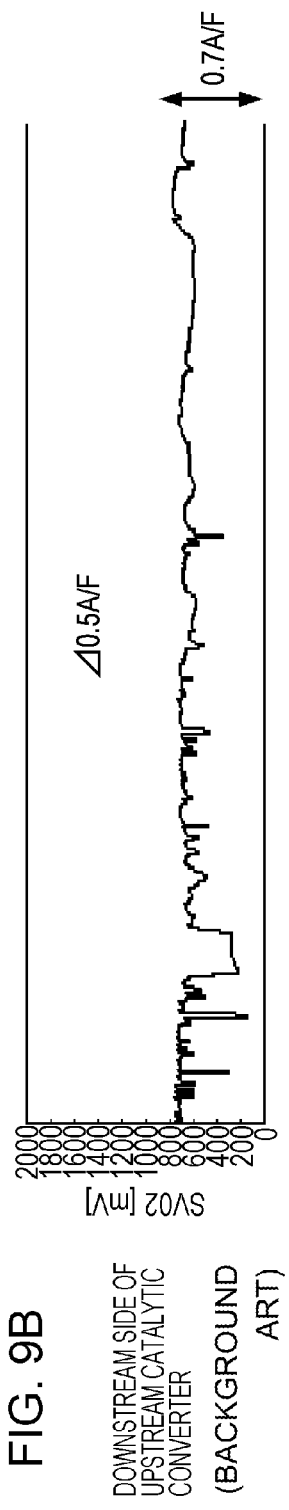
Figure 9C:
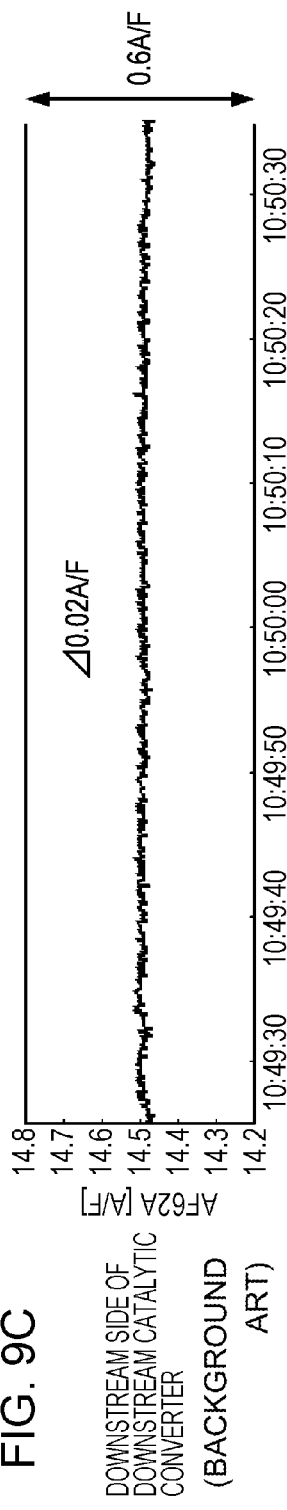

Here, a linear air-fuel sensor (LAF sensor) is arranged on the upstream side of the upstream catalytic converter of Conventional Example 1. An $O_2$ sensor is arranged on the downstream side of the upstream catalytic converter (between the upstream catalytic converter and the downstream catalytic converter). Another $O_2$ sensor is arranged on the downstream side of the downstream catalytic converter. The air-fuel ratios (A/F) of exhaust are measured at these points. The results are illustrated in FIGS. 9A to 9C. As is clear from FIGS. 9A to 9C, the air-fuel ratio (A/F) of the exhaust at the point located on the downstream side of the upstream catalytic converter is more stable than that at the point located on the upstream side of the upstream catalytic converter. Furthermore, the air-fuel ratio (A/F) of the exhaust at the point located on the downstream side of the downstream catalytic converter is most stable. In this way, in the catalytic converter unit of Conventional Example 1, the air-fuel ratio (A/F) of the exhaust passing through the catalytic converter unit is stabilized in the vicinity of the stoichiometric ratio because Rh in the upstream catalytic converter has a high capability of occluding and releasing oxygen. Thus, in the catalytic converter unit of Conventional Example 1, the three-way catalyst in the catalytic converter unit efficiently purifies the exhaust.

In contrast, in the catalytic converter unit of Conventional Example 2, Pd has a low capability of occluding and releasing oxygen; hence, the air-fuel ratio (A/F) of the exhaust passing through the catalytic converter unit is not stabilized in the vicinity of the stoichiometric ratio, compared with Conventional Example 1. Thus, in the catalytic converter unit of Conventional Example 2, the three-way catalyst in the catalytic converter unit does not efficiently purify the exhaust, compared with Conventional Example 1, thereby leading to low exhaust purification efficiency.

Second, the exhaust purification performance of Pd at a low temperature is lower than that of Rh.

Figure 10:
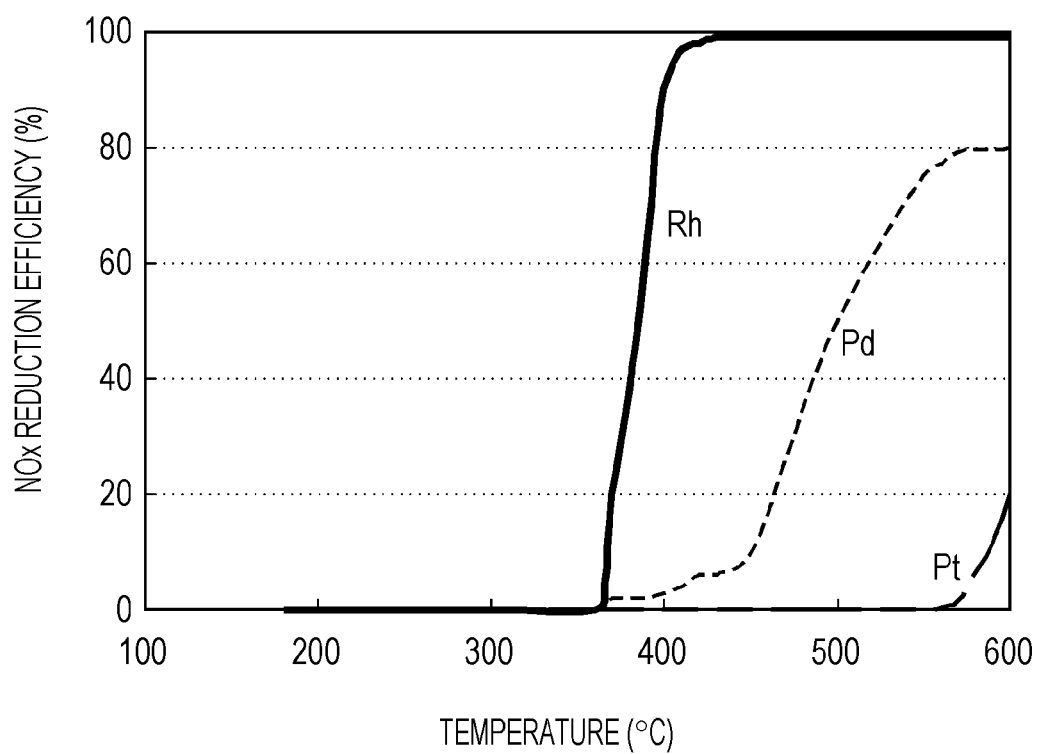
FIG. 10 is a graph illustrating the relationship between the temperature and the NOx reduction efficiency of Rh, Pd, and Pt.

FIG. 10 is a graph illustrating the relationship between the temperature and the NOx reduction efficiency of Rh, Pd, and Pt. As is clear from FIG. 10, the NOx reduction efficiency of Pd at a low temperature is significantly lower than that of Rh. Thus, the exhaust purification efficiency of the catalytic converter unit of Conventional Example 2 is lower than that of Conventional Example 1.

Third, Pd is more susceptible to poisoning by, for example, phosphorus in exhaust than Rh. So, in the catalytic converter unit of Conventional Example 2, Pd is poisoned by, for example, phosphorus in exhaust to fail to provide sufficient exhaust purification performance, thereby leading to low exhaust purification efficiency compared with Conventional Example 1.

The exhaust emission control device 3 according to this embodiment provides the following advantageous effects.

In this embodiment, the three-way catalyst included in the upstream catalytic converter 31 is the first catalyst 310 containing $Al_2O_3$, Pd, and the OSC that has the functions of storing and releasing oxygen. The first catalyst 310 includes the first lower layer catalyst 311 and the first upper layer catalyst 312, the first lower layer catalyst 311 being arranged on the support 315 and containing Pd supported only on the OSC, and the first upper layer catalyst 312 being arranged on the first lower layer catalyst 311 and containing Pd supported on each of the OSC and $Al_2O_3$. That is, the three-way catalyst included in the upstream catalytic converter 31 contains only Pd as a noble metal.

It is known that Pd has a low capability of occluding and releasing oxygen, compared with Rh. In this embodiment, however, Pd in the first lower layer catalyst 311 is supported only on the OSC to maximize the oxygen storage and release capability of the OSC. So, the air-fuel ratio of the exhaust flowing into the downstream catalytic converter 33 is stably controlled in the vicinity of the stoichiometric ratio, thereby improving the exhaust purification efficiency of the downstream catalytic converter 33.

It is also known that the exhaust purification performance of Pd at a low temperature is lower than that of Rh. In this embodiment, however, Pd in the first upper layer catalyst 312 is supported on each of the OSC and $Al_2O_3$ to increase the dispersion of Pd, thereby providing high exhaust purification performance at a low temperature. This leads to improvement in the exhaust purification efficiency of the upstream catalytic converter 31 at, in particular, a low temperature immediately after starting or the like.

So, the exhaust emission control device 3 according to this embodiment has high exhaust purification efficiency despite a small amount of Rh used compared with the related art.

In this embodiment, the Pd content of the first upper layer catalyst 312 is set so as to be lower than the Pd content of the first lower layer catalyst 311.

Pd is known to be more susceptible to poisoning by phosphorus and sulfur than Rh. The degree of poisoning is increased with decreasing distance from the surface. Thus, in this embodiment, the Pd content of the first upper layer catalyst 312 is set to be low, thereby suppressing the poisoning of Pd and a reduction in exhaust purification efficiency.

In this embodiment, Ba is incorporated in each of the first upper layer catalyst 312 and the first lower layer catalyst 311.

Ba is known to suppress the poisoning of the OSC and $Al_2O_3$ by phosphorus. According to the embodiment of the present invention, the incorporation of Ba in each of the first upper layer catalyst 312 and the first lower layer catalyst 311 suppresses the poisoning of the OSC and $Al_2O_3$ in the first upper layer catalyst 312 and the first lower layer catalyst 311 by phosphorus, thus inhibiting a reduction in exhaust purification efficiency.

In this embodiment, the total amount of the OSC content and the $Al_2O_3$ content of the first upper layer catalyst 312 is set so as to be lower than the total amount of the OSC content and the $Al_2O_3$ content of the first lower layer catalyst 311.

This results in a reduction in the heat capacity of the first upper layer catalyst 312, so that the temperature of the first upper layer catalyst 312 is more likely to increase. Thus, the light-off performance of the first upper layer catalyst 312 is improved to enhance the exhaust purification performance at a low temperature.

In this embodiment, the ratio of the OSC content to the $Al_2O_3$ content of the first lower layer catalyst 311 is set so as to be higher than the ratio of the OSC content to the $Al_2O_3$ content of the first upper layer catalyst 312.

Thus, a larger amount of the OSC is arranged in the first lower layer catalyst 311, thereby improving the oxygen occlusion and release capability of the first lower layer catalyst 311. So, the air-fuel ratio of the exhaust flowing into the downstream catalytic converter 33 is more stably controlled in the vicinity of the stoichiometric ratio, thereby further improving the exhaust purification efficiency of the downstream catalytic converter 33.

In this embodiment, the three-way catalyst included in the downstream catalytic converter 33 is the second catalyst 330 containing the OSC, $Al_2O_3$, Pd, and Rh. The total amount of the Pd content and the Rh content of the second catalyst 330 is set so as to be lower than the Pd content of the first catalyst 310.

This results in a further reduction in the amount of Rh used while the high exhaust purification efficiency is maintained.

In this embodiment, the second catalyst 330 includes the second lower layer catalyst 331 and the second upper layer catalyst 332, the second lower layer catalyst 331 containing Pd supported on each of the OSC and $Al_2O_3$, and the second upper layer catalyst 332 being arranged on the second lower layer catalyst 331 and containing Rh supported on each of the OSC and $Al_2O_3$. The total amount of the OSC content and the $Al_2O_3$ content of the second lower layer catalyst 331 is set so as to be higher than the total amount of the OSC content and the $Al_2O_3$ content of the second upper layer catalyst 332.

Thereby, Rh provides the inherent high exhaust purification performance in the second upper layer catalyst 332. Furthermore, the heat capacity of the second upper layer catalyst 332 is reduced, so that the temperature of the second upper layer catalyst 332 is more likely to increase. Thus, the light-off performance of the second upper layer catalyst 332 is improved to enhance the exhaust purification performance at a low temperature.

The present invention is not limited to the foregoing embodiment. Changes, modifications, and so forth may be made without departing from the scope of the invention.

EXAMPLES

While examples of the embodiment of the present invention will be described below, the present invention is not limited to these examples.

Example 1 and Comparative Example 1

An exhaust emission control device including the catalytic converter unit according to the foregoing embodiment was defined as a device of Example 1. An exhaust emission control device including the catalytic converter unit described in WO2010/61804 (corresponding to Conventional Example 1 in Table 1) was defined as a device of Comparative Example 1. Proportions of noble metals in the catalytic converters of Example 1 and Comparative Example 1 were set as described in Table 2.

TABLE 2

|  | Upstream catalytic converter | | Downstream catalytic converter | | Total amount | |
| --- | --- | --- | --- | --- | --- | --- |
|  | Pd (g/L) | Rh (g/L) | Pd (g/L) | Rh (g/L) | Pd (g/L) | Rh (g/L) |
| Conventional Example 1 | 4.00 | 0.55 | 0.75 | 0.45 | 4.75 | 1.00 |
| Example 1 | 4.55 | 0 | 0.75 | 0.45 | 5.30 | 0.45 |

Compositions of catalysts in the catalytic converters of Example 1 were set as described in Table 3. As the OSC, $CeO_2$ was used. Ba was incorporated in each of the first upper layer catalyst and the first lower layer catalyst. In the first lower layer catalyst, Pd was supported only on the OSC. In the first upper layer catalyst, Pd was supported on each of the OSC and $Al_2O_3$. In the second lower layer catalyst, Pd was supported on each of the OSC and $Al_2O_3$. In the second upper layer catalyst, Rh was supported on each of the OSC and $Al_2O_3$.

TABLE 3

|  | Noble metal (g/L) | | | $Al_2O_3$•OSC (g/L) | $Al_2O_3$:OSC | |
| --- | --- | --- | --- | --- | --- | --- |
|  | Pd | Rh | Total |  | $Al_2O_3$ | OSC |
| First upper layer catalyst | 1.55 | — | 4.55 | 100 | 7 | 3 |
| First lower layer catalyst | 3.0 | — |  | 200 | 5 | 5 |

TABLE 3-continued

|  | Noble metal (g/L) | | | Al₂O₃•OSC | Al₂O₃:OSC | |
| --- | --- | --- | --- | --- | --- | --- |
|  | Pd | Rh | Total | (g/L) | Al₂O₃ | OSC |
| Second upper layer catalyst | — | 0.45 | 1.2 | 40 | 5 | 5 |
| Second lower layer catalyst | 0.75 | — |  | 100 | 6 | 4 |

The catalytic converter units of Example 1 and Comparative Example 1 were attached to respective test cars. The test cars were driven under the same conditions in the U.S. LA-4 mode (combination of urban driving and highway driving). The tailpipe emissions were measured. The measurement results are illustrated in FIG. 11.

Figure 11:
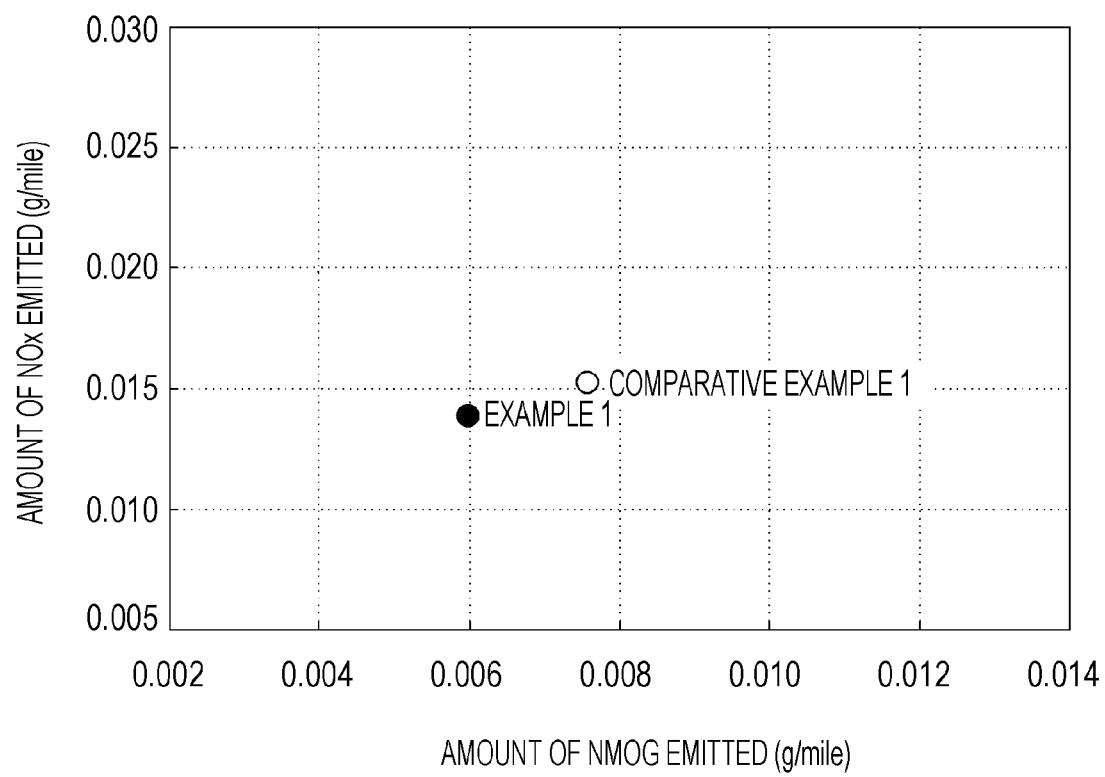
FIG. 11 is a graph illustrating the amount of NMOG emitted and the amount of NOx emitted in Example 1 and Comparative Example 1.
Figure 12:
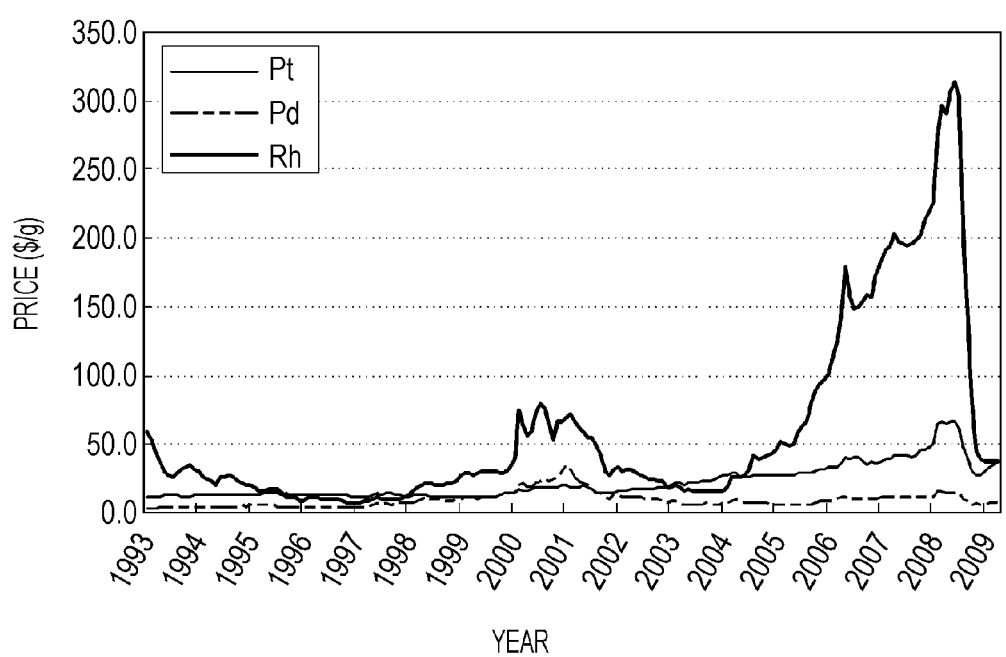
FIG. 12 is a graph illustrating annual changes in the prices of Pt, Pd, and Rh.

As is clear from FIG. 11, in the catalytic converters of Example 1, both of the amount of NMOG emitted and the amount of NOx emitted are small, compared with the catalytic converters of Comparative Example 1. The results demonstrated that the exhaust emission control device according to the embodiments of the present invention has high exhaust purification efficiency despite a small amount of Rh used, compared with the related art.

The embodiment of the present invention provides an exhaust emission control device (for example, an exhaust emission control device 3 described below) for an internal combustion engine, the exhaust emission control device including a catalytic converter unit arranged in an exhaust passage (for example, an exhaust pipe 13 described below) of the internal combustion engine (for example, an engine 1 described below), the catalytic converter unit being configured to purify exhaust from the internal combustion engine, and the catalytic converter unit including an upstream catalytic converter (for example, an upstream catalytic converter 31 described below) and a downstream catalytic converter (for example, a downstream catalytic converter 33 described below) arranged on the downstream side of the upstream catalytic converter. In the exhaust emission control device for an internal combustion engine according to an embodiment of the present invention, the upstream catalytic converter includes a support (for example, a support 315 described below) and a first catalyst supported on the support, the first catalyst (for example, a first catalyst 310 described below) containing Al₂O₃, Pd, and an OSC that has the function of storing and releasing oxygen, in which the first catalyst includes a first lower layer catalyst (for example, a first lower layer catalyst 311 described below) arranged on the support, Pd in the first lower layer catalyst being supported only on the OSC, and a first upper layer catalyst (for example, a first upper layer catalyst 312 described below) arranged on the first lower layer catalyst, Pd in the first upper layer catalyst being supported on each of the OSC and Al₂O₃.

According to the embodiment of the present invention, the exhaust purification catalyst included in the upstream catalytic converter is the first catalyst containing Al₂O₃, Pd, and the OSC that has the function of storing and releasing oxygen. The first catalyst includes the first lower layer catalyst arranged on the support, Pd in the first lower layer catalyst being supported only on the oxygen storage component, and the first upper layer catalyst arranged on the first lower layer catalyst, Pd in the first upper layer catalyst being supported on each of the oxygen storage component and Al₂O₃. That is, the exhaust purification catalyst included in the upstream catalytic converter contains only Pd as a noble metal.

It is known that Pd has a low capability of occluding and releasing oxygen, compared with Rh. According to the embodiment of the present invention, Pd in the first lower layer catalyst is supported only on the OSC to maximize the oxygen storage and release capability of the OSC. So, the air-fuel ratio of the exhaust flowing into the downstream catalytic converter is stably controlled in the vicinity of the stoichiometric ratio, thereby improving the exhaust purification efficiency of the downstream catalytic converter.

It is also known that the exhaust purification performance of Pd at a low temperature is lower than that of Rh. According to the embodiment of the present invention, Pd in the first upper layer catalyst is supported on each of the OSC and Al₂O₃ to increase the dispersion of Pd, thereby providing high exhaust purification performance at a low temperature. This leads to improvement in the exhaust purification efficiency of the upstream catalytic converter at, in particular, a low temperature immediately after starting or the like.

So, the exhaust emission control device according to the embodiment of the present invention has high exhaust purification efficiency despite a small amount of Rh used compared with the related art.

In this case, preferably, the Pd content of the first upper layer catalyst is lower than the Pd content of the first lower layer catalyst.

According to the embodiment of the present invention, the Pd content of the first upper layer catalyst is set so as to be lower than the Pd content of the first lower layer catalyst.

Pd is known to be more susceptible to poisoning by phosphorus and sulfur than Rh. The degree of poisoning is increased with decreasing distance from the surface. Thus, according to the embodiment of the present invention, the Pd content of the first upper layer catalyst is set to be low, thereby suppressing the poisoning of Pd and a reduction in exhaust purification efficiency.

In this case, preferably, each of the first upper layer catalyst and the first lower layer catalyst contains Ba.

According to the embodiment of the present invention, Ba is incorporated in each of the first upper layer catalyst and the first lower layer catalyst.

Ba is known to suppress the poisoning of the OSC and Al₂O₃ by phosphorus. According to the embodiment of the present invention, the incorporation of Ba in each of the first upper layer catalyst and the first lower layer catalyst suppresses the poisoning of the OSC and Al₂O₃ in the first upper layer catalyst and the first lower layer catalyst by phosphorus, thus inhibiting a reduction in exhaust purification efficiency.

In this case, preferably, the total amount of the oxygen storage component content and the Al₂O₃ content of the first upper layer catalyst is lower than the total amount of the oxygen storage component content and the Al₂O₃ content of the first lower layer catalyst.

According to the embodiment of the present invention, the total amount of the oxygen storage component content and the Al₂O₃ content of the first upper layer catalyst is set so as to be lower than the total amount of the oxygen storage component content and the Al₂O₃ content of the first lower layer catalyst.

This results in a reduction in the heat capacity of the first upper layer catalyst, so that the temperature of the first upper layer catalyst is more likely to increase. Thus, the light-off performance of the first upper layer catalyst is improved to enhance the exhaust purification performance at a low temperature.

In this case, preferably, the ratio of the oxygen storage component content to the Al₂O₃ content of the first lower layer catalyst is higher than the ratio of the oxygen storage component content to the $Al_2O_3$ content of the first upper layer catalyst.

According to the embodiment of the present invention, the ratio of the OSC content to the $Al_2O_3$ content of the first lower layer catalyst is set so as to be higher than the ratio of the OSC content to the $Al_2O_3$ content of the first upper layer catalyst.

Thus, a larger amount of the OSC is arranged in the first lower layer catalyst, thereby improving the oxygen occlusion and release capability of the first lower layer catalyst. So, the air-fuel ratio of the exhaust flowing into the downstream catalytic converter is more stably controlled in the vicinity of the stoichiometric ratio, thereby further improving the exhaust purification efficiency of the downstream catalytic converter.

In this case, preferably, the downstream catalytic converter includes a support (for example, a support 335 described below) and a second catalyst (for example, a second catalyst 330 described below) supported on the support, the second catalyst containing $Al_2O_3$, Pd, Rh, and an oxygen storage component that has the function of storing and releasing oxygen, in which the total amount of the Pd content and the Rh content of the second catalyst is lower than the Pd content of the first catalyst.

According to the embodiment of the present invention, the exhaust purification catalyst included in the downstream catalytic converter is the second catalyst containing the OSC, $Al_2O_3$, Pd, and Rh. In addition, the total amount of the Pd content and the Rh content of the second catalyst is set so as to be lower than the Pd content of the first catalyst.

This results in a further reduction in the amount of Rh used while the high exhaust purification efficiency is maintained.

In this case, preferably, the second catalyst includes a second lower layer catalyst (for example, a second lower layer catalyst 331 described below) arranged on the support, Pd in the second lower layer catalyst being supported on each of the OSC and $Al_2O_3$, and a second upper layer catalyst (for example, a second upper layer catalyst 332 described below) arranged on the second lower layer catalyst, Rh being supported on each of the OSC and $Al_2O_3$, in which the total amount of the OSC content and the $Al_2O_3$ content of the second lower layer catalyst is higher than the total amount of the OSC content and the $Al_2O_3$ content of the second upper layer catalyst.

According to the embodiment of the present invention, the second catalyst includes the second lower layer catalyst and the second upper layer catalyst, the second lower layer catalyst containing Pd supported on each of the OSC and $Al_2O_3$, and the second upper layer catalyst being arranged on the second lower layer catalyst and containing Rh supported on each of the OSC and $Al_2O_3$. The total amount of the OSC content and the $Al_2O_3$ content of the second lower layer catalyst is set so as to be higher than the total amount of the OSC content and the $Al_2O_3$ content of the second upper layer catalyst.

Thereby, Rh provides the inherent high exhaust purification performance in the second upper layer catalyst. Furthermore, the heat capacity of the second upper layer catalyst is reduced, so that the temperature of the second upper layer catalyst is more likely to increase. Thus, the light-off performance of the second upper layer catalyst is improved to enhance the exhaust purification performance at a low temperature.

Obviously, numerous modifications and variations of the present invention are possible in light of the above teachings. It is therefore to be understood that within the scope of the appended claims, the invention may be practiced otherwise than as specifically described herein.

What is claimed is:

1. An exhaust emission control device for an internal combustion engine, comprising:
  a catalytic converter arranged in an exhaust passage of the internal combustion engine, the catalytic converter being configured to purify exhaust from the internal combustion engine, the catalytic converter comprising:
    an upstream catalytic converter; and
    a downstream catalytic converter arranged on a downstream side of the upstream catalytic converter,
    the upstream catalytic converter comprising:
      a first support; and
      a first catalyst supported on the first support, the first catalyst containing $Al_2O_3$, Pd, and an oxygen storage component that has a function of storing and releasing oxygen, the first catalyst comprising:
        a first lower layer catalyst provided on the first support, Pd in the first lower layer catalyst being supported only on the oxygen storage component contained in the first catalyst; and
        a first upper layer catalyst provided on the first lower layer catalyst, Pd in the first upper layer catalyst being supported on each of the oxygen storage component and $Al_2O_3$ contained in the first catalyst.

2. The exhaust emission control device for an internal combustion engine according to claim 1, wherein a Pd content of the first upper layer catalyst is lower than a Pd content of the first lower layer catalyst.

3. The exhaust emission control device for an internal combustion engine according to claim 1, wherein each of the first upper layer catalyst and the first lower layer catalyst contains Ba.

4. The exhaust emission control device for an internal combustion engine according to claim 1, wherein a total amount of an oxygen storage component content and a $Al_2O_3$ content of the first upper layer catalyst is lower than a total amount of an oxygen storage component content and a $Al_2O_3$ content of the first lower layer catalyst.

5. The exhaust emission control device for an internal combustion engine according to claim 1, wherein a ratio of an oxygen storage component content to a $Al_2O_3$ content of the first lower layer catalyst is higher than a ratio of an oxygen storage component content to a $Al_2O_3$ content of the first upper layer catalyst.

6. The exhaust emission control device for an internal combustion engine according to claim 1,
  wherein the downstream catalytic converter comprises
    a second support, and
    a second catalyst supported on the second support, the second catalyst containing $Al_2O_3$, Pd, Rh, and an oxygen storage component that has a function of storing and releasing oxygen, and
  wherein a total amount of a Pd content and a Rh content of the second catalyst is lower than a Pd content of the first catalyst.

7. The exhaust emission control device for an internal combustion engine according to claim 6,
  wherein the second catalyst comprises
    a second lower layer catalyst provided on the second support, Pd in the second lower layer catalyst being supported on each of the oxygen storage component and $Al_2O_3$ contained in the second catalyst, and
    a second upper layer catalyst provided on the second lower layer catalyst, Rh being supported on each of the oxygen storage component and $Al_2O_3$ contained in the second catalyst, and wherein a total amount of an oxygen storage component content and a $Al_2O_3$ content of the second lower layer catalyst is higher than a total amount of an oxygen storage component content and a $Al_2O_3$ content of the second upper layer catalyst.

8. The exhaust emission control device for an internal combustion engine according to claim 6, wherein the oxygen storage component contained in the second catalyst comprises at least one of $CeO_2$, $ZrO_2$, and complex oxides of Ce and Zr.

9. The exhaust emission control device for an internal combustion engine according to claim 1, wherein the oxygen storage component contained in the first catalyst comprises at least one of $CeO_2$, $ZrO_2$, and complex oxides of Ce and Zr.

* * * * *